(12) United States Patent
Miura et al.

(10) Patent No.: US 7,275,363 B2
(45) Date of Patent: Oct. 2, 2007

(54) EXHAUST GAS PURIFYING APPARATUS AND METHOD FOR INTERNAL COMBUSTION ENGINE

(75) Inventors: Manabu Miura, Kanagawa (JP); Yasuhisa Kitahara, Yokohama (JP); Takashi Shirakawa, Yokohama (JP); Kousuke Yasuhara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 225 days.

(21) Appl. No.: 10/833,129

(22) Filed: Apr. 28, 2004

(65) Prior Publication Data

US 2004/0250532 A1   Dec. 16, 2004

(30) Foreign Application Priority Data

Jun. 11, 2003  (JP) ............................. 2003-166046

(51) Int. Cl.
*F01N 3/00* (2006.01)
(52) U.S. Cl. ........................... 60/277; 60/276; 60/286; 60/295; 60/301
(58) Field of Classification Search .................. 60/276, 60/277, 286, 295, 301
See application file for complete search history.

(56) References Cited

U.S. PATENT DOCUMENTS

| | | | | |
|---|---|---|---|---|
| 5,577,382 | A * | 11/1996 | Kihara et al. ................. | 60/276 |
| 5,735,119 | A * | 4/1998 | Asanuma et al. ............. | 60/276 |
| 5,771,685 | A * | 6/1998 | Hepburn ....................... | 60/274 |
| 5,970,707 | A * | 10/1999 | Sawada et al. ................ | 60/277 |
| 5,983,629 | A * | 11/1999 | Sawada ......................... | 60/276 |
| 6,112,518 | A * | 9/2000 | Jerger et al. ................... | 60/277 |
| 6,209,316 | B1 | 4/2001 | Duvinage et al. | |
| 6,216,449 | B1 | 4/2001 | Strehlau et al. | |
| 6,216,451 | B1 * | 4/2001 | Schnaibel et al. ............ | 60/277 |
| 6,244,046 | B1 * | 6/2001 | Yamashita ..................... | 60/285 |
| 6,345,498 | B2 * | 2/2002 | Yonekura et al. ............. | 60/277 |
| 6,681,564 | B2 * | 1/2004 | Nishiyama et al. ........... | 60/285 |
| 6,804,951 | B2 * | 10/2004 | Nader et al. ................... | 60/277 |
| 2004/0226284 | A1 | 11/2004 | Kitahara et al. | |
| 2004/0250535 | A1 | 12/2004 | Miura | |

FOREIGN PATENT DOCUMENTS

| | | |
|---|---|---|
| JP | 11-324654 A | 11/1999 |
| JP | 2001-132435 A | 5/2001 |

* cited by examiner

*Primary Examiner*—Thomas Denion
*Assistant Examiner*—Diem Tran
(74) *Attorney, Agent, or Firm*—Foley & Lardner LLP

(57) ABSTRACT

In exhaust gas purifying apparatus and method for an internal combustion engine, a degree of a performance deterioration of an NOx trap catalyst is determined on the basis of a detected air-fuel ratio variation time difference, at the performance deterioration determination of the NOx trap catalyst, the degree of the performance deterioration with at least one of correcting factors of a quantity of NOx trapped by means of the NOx trap catalyst, a reducing agent supply quantity by which a reducing agent is supplied to the NOx trap catalyst, and catalyst temperature which is a temperature of the NOx trap catalyst, and at least one of the correcting factors is reflected on the determination of the degree of the performance deterioration of the NOx trap catalyst.

19 Claims, 13 Drawing Sheets

FIG.8
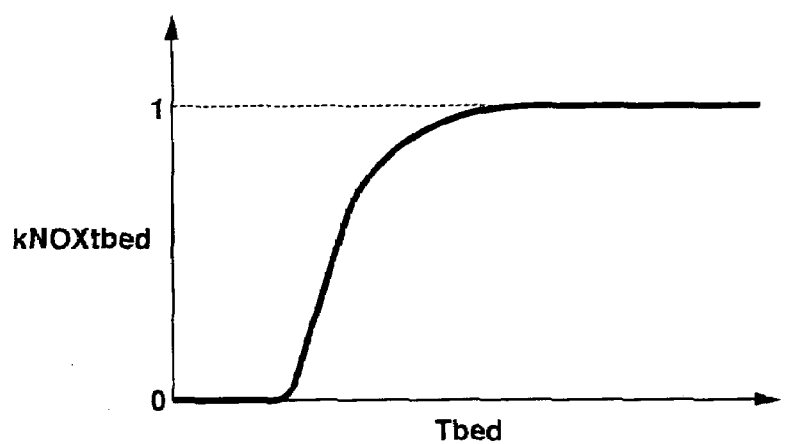
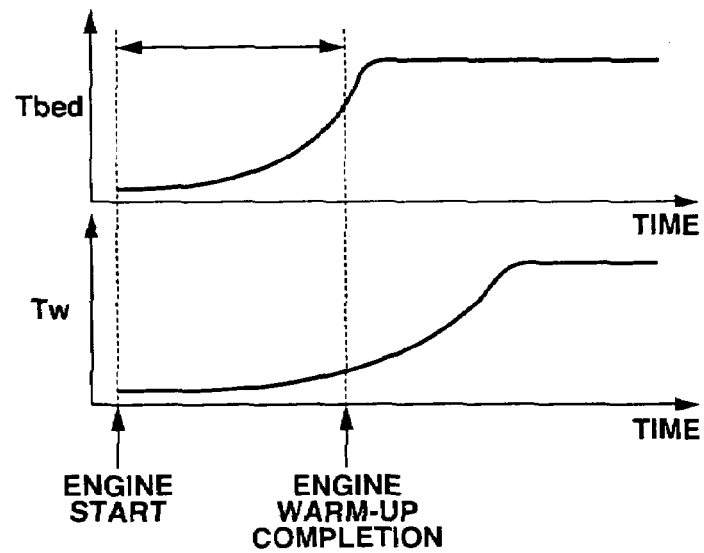
FIG.9A
FIG.9B

EXHAUST GAS PURIFYING APPARATUS AND METHOD FOR INTERNAL COMBUSTION ENGINE

BACKGROUND OF THE INVENTION

1. Field of the Invention

The present invention relates to exhaust gas purifying apparatus and method for an internal combustion engine which includes an NOx trap catalyst and, particularly, relates to a technique of determining a degree of a deterioration of NOx trap catalyst.

2. Description of the Related Art

A typical exhaust gas purifying apparatus of a lean burn engine including an NOx trap catalyst is well known. The NOx trap catalyst has qualities different in accordance with the air-fuel ratio of the exhaust gas. Nitrogen oxides (hereinafter, referred to as NOx) in the exhaust gas are trapped when an air-fuel ratio of the exhaust gas is lean. On the other hand, when the air-fuel ratio is returned to a rich, the NOx trap catalyst discharges trapped NOx. A Japanese Patent Application first Publication No. Heisei 11-324654 published on Nov. 26, 1999 exemplifies an evaluation of a performance deterioration of the NOx trap catalyst. In details, air-fuel ratio sensors are disposed at both of upstream side and downstream side of NOx trap catalyst. A time duration from a first time point at which the air-fuel ratio of the exhaust gas is turned to be rich to a second time point at which a reducing agent of the exhaust gas passes the NOx trap catalyst. The determination of NOx trap catalyst is determined according to the detected time duration. The first time point is identified according to an output of the upstream side air-fuel ratio and the second time point is identified according to an output from the downstream side air ratio sensor.

SUMMARY OF THE INVENTION

However, the above-described performance deterioration determination technique has the following problem. That is to say, a time duration from a time point at which the air-fuel ratio of the exhaust gas is turned to a time point at which the reducing agent in the exhaust gas passes through the NOx trap catalyst is not uniformly specified but is varied under an influence of variety of factors. The variety of factors include a quantity of NOx by which the NOx trap catalyst us trapped, a quantity of a reducing agent supplied to NOx trap catalyst during the turn of the exhaust gas to be rich, and a temperature of NOx trap catalyst. When these factors are not considered, for example, when the trapped quantity of NOx is greater than a set reference, the above-described technique cannot detect the deterioration even if the trap catalyst of NOx is deteriorated exceeding an allowance range.

It is, therefore, an object of the present invention to provide exhaust gas purifying apparatus and method for an internal combustion engine which are capable of accurately determining a degree of the deterioration of NOx trap catalyst.

According to one aspect of the present invention, there is provided an exhaust gas purifying apparatus for an internal combustion engine, comprising: an NOx trap catalyst trapping NOx in the exhaust gas when an air-fuel ratio of the exhaust gas flowing thereinto is lean and discharging the trapped NOx when the air-fuel ratio of the exhaust gas flowing thereinto is rich; a rich controlling section that performs a rich control to richen the air-fuel ratio flowing into an NOx trap catalyst; a first time point specifying section that specifies a first time point at which the air-fuel ratio of the exhaust gas at an upstream side of the NOx trap catalyst has reached to a first predetermined value indicating a rich; a second time point specifying section that specifices a second time point at which the air-fuel ratio of the exhaust gas at a downstream side of the NOx trap catalyst has reached to a second predetermined value indicating the rich; an air-fuel ratio variation time difference detecting section that detects a time duration from the first time point to the second time point in a form of an air-fuel ratio variation time difference; and a performance deterioration determining section that determines a degree of a performance deterioration of the NOx trap catalyst on the basis of the detected air-fuel ratio variation time difference, the performance deterioration determining section determining the degree of the performance deterioration with at least one of correcting factors of a quantity of NOx trapped by means of the NOx trap catalyst, a reducing agent supply quantity by which a reducing agent is supplied to the NOx trap catalyst, and catalyst temperature which is a temperature of the NOx trap catalyst, at least one of the correcting factors being reflected on the determination of the degree of the performance deterioration of the NOx trap catalyst.

According to another aspect of the present invention, there is provided an exhaust gas purifying method for an internal combustion engine, comprising: providing an NOx trap catalyst trapping NOx in the exhaust gas when an air-fuel ratio of the exhaust gas flowing thereinto is lean and discharging the trapped NOx when the air-fuel ratio of the exhaust gas flowing thereinto is rich; performing a rich control to richen the air-fuel ratio flowing into an NOx trap catalyst; specifying a first time point at which the air-fuel ratio of the exhaust gas at an upstream side of the NOx trap catalyst has reached to a first predetermined value indicating a rich; specifying a second time point at which the air-fuel ratio of the exhaust gas at a downstream side of the NOx trap catalyst has reached to a second predetermined value indicating the rich; detecting a time duration from the first time point to the second time point in a form of an air-fuel ratio variation time difference; and determining a degree of a performance deterioration of the NOx trap catalyst on the basis of the detected air-fuel ratio variation time difference, at the performance deterioration determination, determining the degree of the performance deterioration with at least one of correcting factors of a quantity of NOx trapped by means of the NOx trap catalyst, a reducing agent supply quantity by which a reducing agent is supplied to the NOx trap catalyst, and catalyst temperature which is a temperature of the NOx trap catalyst, at least one of the correcting factors being reflected on the determination of the degree of the performance deterioration of the NOx trap catalyst.

This summary of the invention does not necessarily describe all necessary features so that the invention may also be a sub-combination of these described features.

BRIEF DESCRIPTION OF THE DRAWINGS

FIG. 8 is a calculation table representing a trap quantity correction coefficient kNOXneqf according to the driving states Ne and Qf.

FIGS. 9A and 9B are maps representing a relationship between a coolant temperature Tw and a catalyst temperature Tbed.

DETAILED DESCRIPTION OF THE PREFERRED EMBODIMENTS

Reference will hereinafter be made to the drawings in order to facilitate a better understanding of the present invention.

Figure 1:
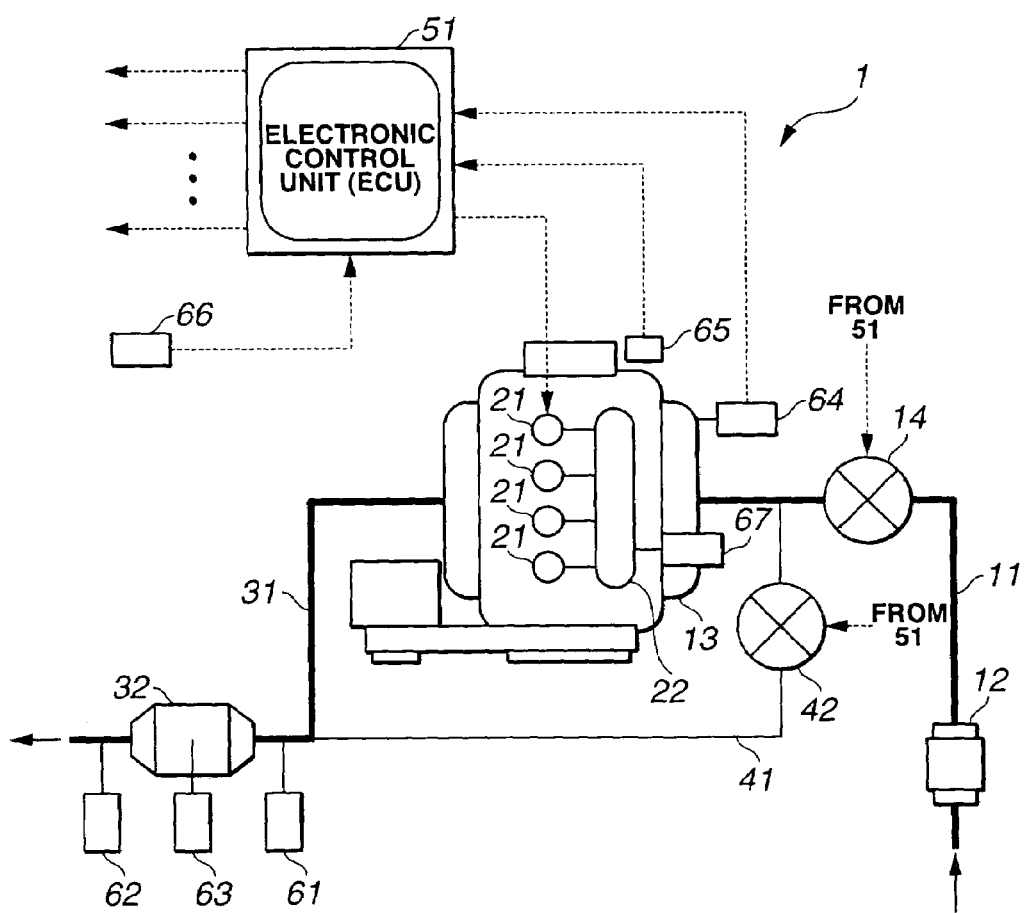
FIG. 1 is a rough system configuration view of a Diesel engine to which an exhaust gas purifying apparatus in a preferred embodiment according to the present invention is applicable.

FIG. 1 shows a structure of an automotive Diesel engine to which an exhaust gas purifying apparatus in a preferred embodiment is applicable. An air cleaner (not shown) is attached onto an air introduction portion of an intake-air passage 11 to eliminate dust and dirt in a suction air. An air-flow meter 12 is installed at a downstream side of the air cleaner. Air-flow meter 12 serves to detect an intake-air quantity. The suction air passed through air-flow meter 12 is streamed into a surge tank 13 and an intake manifold serves to distribute the suction air to each of engine cylinders. An intake air throttle valve 14 is disposed which is operated in accordance with a signal from an electronic control unit 51 (hereinafter, abbreviated as ECU. Intake air throttle valve 14 serves to control the intake-air quantity. An injector 21 exposed on a center portion of a combustion chamber is installed on a cylinder head so as to be exposed to an engine main body. The fuel distributed through a fuel pump (not shown) is supplied to injector 21 under a predetermined pressure via a common rail 22. A fuel injection through injector 21 is carried out by a plurality of number of times. Injector 21 is exposed to a center of an upper portion of a combustion chamber. Injector 21 performs a main injection to generate an engine output and a post injection at a time retarded than a timing of the main injection. The post injection causes an exhaust gas temperature to be raised at a temperature higher than a normal time.

An NOx trap catalyst 32 is disposed at a downstream side of an exhaust manifold of an exhaust passage 31. During the normal time at which engine 1 is driven with an excess air ratio larger than one, NOx in the exhaust gas is eliminated by means of NOx trap catalyst 32. When NOx trap catalyst is detected which exceeds a prescribed quantity, the excess air rate is turned to a smaller value than 1, NOx trap catalyst 32 discharges NOx trapped. When the discharge occurs, NOx is purified by means of the reducing agent in the exhaust gas such as a carbon hydrogen and a carbon monoxide.

An exhaust passage 31 is connected to a suction air passage 11 by means of an EGR (Exhaust Gas Recirculation) tube 41. An EGR valve 42 is installed which is operated in accordance with a signal from ECU 51. ECU 51 controls an opening angle of EGR valve 42. According to the opening angle of EGR valve 42, part of the exhaust gas is circulated into suction air passage 11. Sensors 61 and 62 are disposed in exhaust passage 31 at the upstream and downstream sides of NOx trap catalyst 32. Air-fuel ratio of the exhaust gas (hereafter, also referred to as an upstream side air-fuel ratio) at the upstream side of NOx trap catalyst and air-fuel ratio disposed in exhaust passage 31 at the downstream side (hereinafter, also referred to as a downstream side air-fuel ratio) are respectively detected. Another sensor 63 is disposed on NOx trap catalyst. Sensor 63 detects a head temperature of NOx trap catalyst 32 (hereinafter, called catalyst temperature). ECU 51 inputs intake-air quantity detection signal, air-fuel ratio detection signals from sensors 61 and 62, a catalyst temperature detection signal from sensor 63, and a coolant temperature detection signal from sensor 64, a crank angle detection signal from a sensor 65 (ECU 51 calculates an engine speed Ne from this signal), an accelerator opening angle signal from sensor 66, and a fuel pressure detection signal from sensor 67, respectively.

Next, an operation of ECU 51 will be explained with reference to various operational flowchart.

Figure 2:
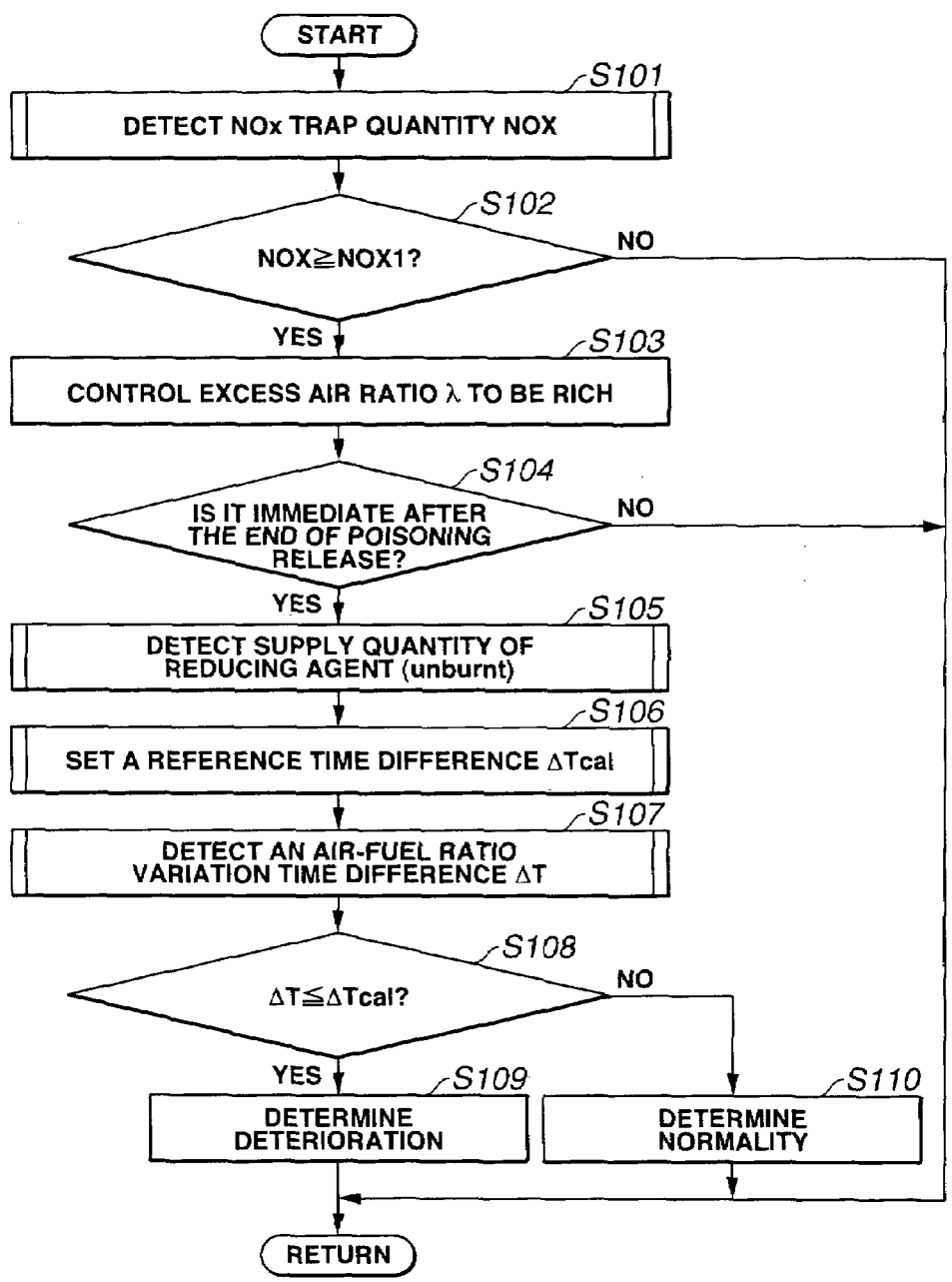
FIG. 2 is an operational flowchart representing a deterioration determination procedure in the exhaust gas purifying apparatus according to the present invention.

FIG. 2 shows an operational flowchart for a performance deterioration determination routine executed for each predetermined period of time, for example, 20 milliseconds. At a step S102, ECU 51 determines an NOx trap quantity NOX. NOx trap quantity NOX is a quantity of NOx trapped by means of NOx trap catalyst. At a step S102, ECU 51 determines whether NOx trap quantity NOX has reached to a predetermined value of NOX1. If reached to predetermined value NOX1 (Yes), the routine goes to a step S103. If does not reach to predetermined value NOX1 (No), the routine is ended and again started after the predetermined period of time. Predetermined value NOX defines a time period for which an NOx regeneration is carried out with the trapped NOx discharged and is set to a value corresponding to an upper limit of a trap capability of NOx trap catalyst 32. At step S103, ECU 51 controls excess air rate $\lambda$ to give a predetermined value t$\lambda$ indicating the rich of excess air rate $\lambda$. A control of excess air rate $\lambda$ is carried out by operating intake-air throttle valve 14 or EGR valve 42. At step S104, ECU 51 determines whether it is an immediate after a completion of a release of poisoning of NOx trap catalyst by means of a sulfur compound. This sulfur compound is included in the exhaust gas. NOx trap catalyst 32 traps the sulfur compound at the same time as the NOx in the exhaust gas is trapped. The immediate after the release of the poisoning is carried out by determining that a travel distance of the vehicle has reached to a predetermined distance from a time point at which the control to release the poisoning carried out at a previous time has been ended or by determining that this step is advanced at the first time when the poisoning is released at the previous time. In addition, the release of the poisoning is carried out by operating intake-air throttle valve 14 so that excess air rate λ is given to a value corresponding to the stoichiometric air-fuel ratio, by carrying out the post injection through fuel injector 21, and by raising the exhaust gas temperature than the normal time. At a time point at which a predetermined period of time has passed after the execution of a post injection, ECU 51 determines that the poisoning is released and returns excess air rate to its normal value. If it is the immediate after the release of the poisoning, the routine goes to a step S106. Otherwise, the routine is ended and the routine is restarted.

At step S105, ECU 51 detects a reducing agent supply quantity unburnt. Reducing agent supply quantity unburnt is a quantity of the reducing agent supplied to NOx trap catalyst 32 per unit of time and calculated from a reducing agent supply quantity calculation routine as will be described later. At a step S106, ECU 51 calculates a reference time difference ΔTcal. Reference time difference ΔTcal is calculated at a reference time difference calculation routine as a boundary value dividing the internal and external of an allowance range related to the degree of the performance deterioration of NOx trap catalyst 32 and is calculated at a reference time difference calculation routine as will be described later.

At a step S106, ECU 51 calculates time difference in the variation of air-fuel ratio ΔT. Air-fuel ratio variation time difference ΔT is calculated as a time duration from the time at which the air-fuel ratio in the exhaust gas is turned to a rich state to the time at which the reducing agent in the exhaust gas passes through NOx trap catalyst and is calculated at an air-fuel ratio variation time difference calculation routine as will be described latter. At a step S108, ECU 51 determines whether time difference of air-fuel ratio variation time ΔT is equal to or shorter than ΔTcal. If ΔT≦ΔTcal (Yes) at step S108, the routine goes to a step S109. If ΔT>ΔTcal (No) at step S108, the routine goes to a step S110. At step S109, ECU 51 determines that the degree of the deterioration of NOx trap catalyst 32 falls within the allowance range and sets a normality determination flag. When the deterioration determination flag is set, a warning lamp is illuminated so as to promote the vehicle driver to exchange NOx trap catalyst 32.

Figure 3:
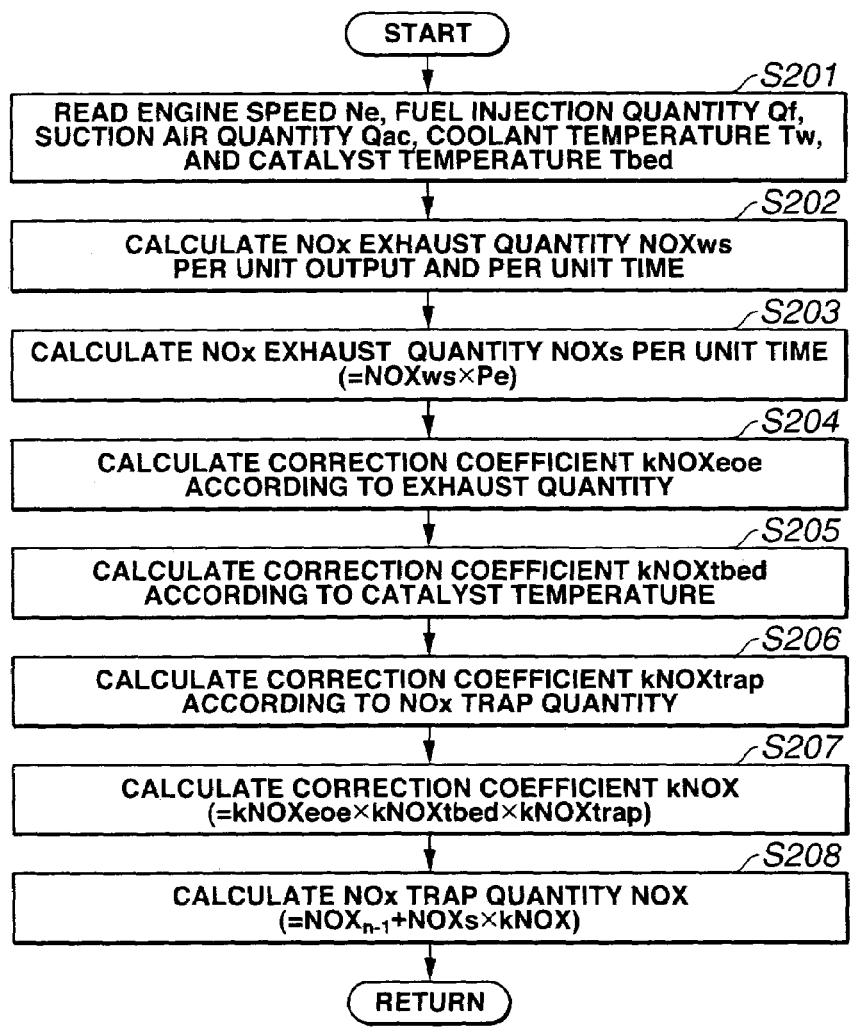
FIG. 3 is an operational flowchart representing an NOx trap quantity calculation procedure.
Figure 4:
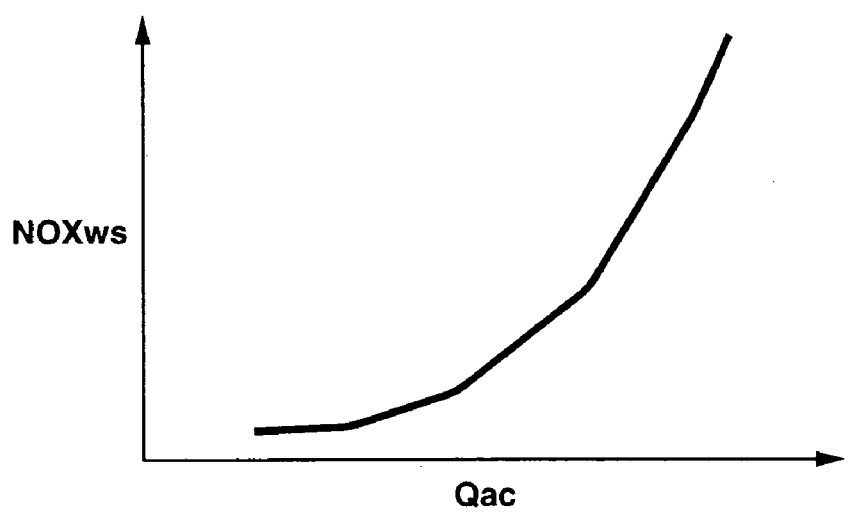
FIG. 4 is a calculation table representing an NOx exhaust quantity NOXws per unit time and per unit output.

FIG. 3 shows an operational flowchart of NOx trap quantity calculation routine. This routine is executed for each predetermined period of time, for example, 20 milliseconds. At a step S201, ECU 51 reads engine speed Ne, fuel injection quantity Qf, intake-air quantity Qac, coolant temperature Tw, and catalyst temperature Tbed. At a step S202, ECU 51 searches a table shown in FIG. 4 according to intake air quantity Qac to calculate a quantity NOXws of NOx exhausted per unit output and per unit time from engine 1. In the table shown in FIG. 4, NOx exhaust quantity NOXws is set to a large value corresponding to a large value Qac.

Figure 5:
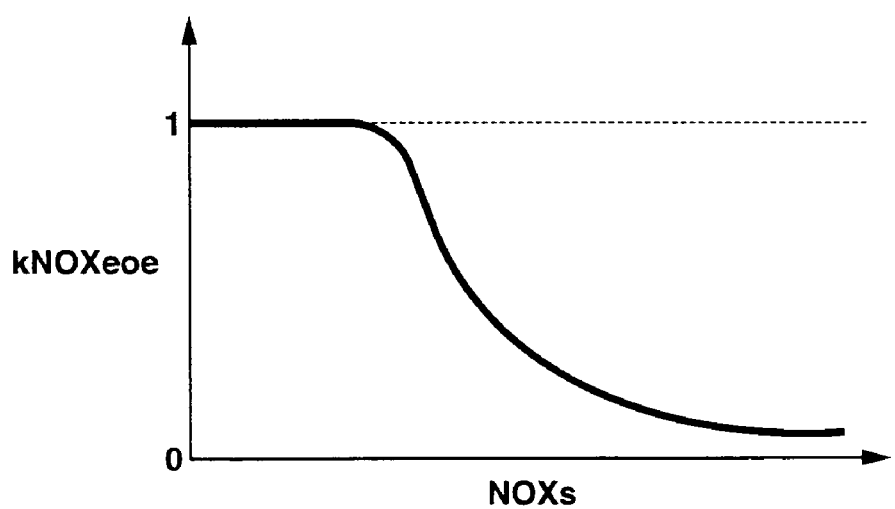
FIG. 5 is a calculation table representing a trap quantity correction coefficient kNOXeoe according to an exhaust gas flow quantity.
Figure 6:
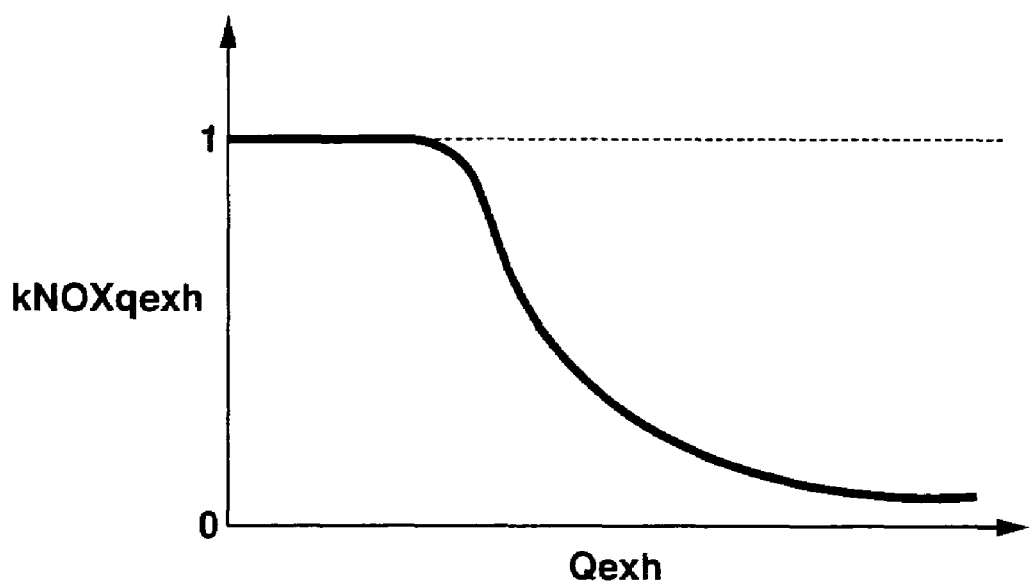
FIG. 6 is a calculation table representing a trap quantity correction coefficient kNOXqexh according to an exhaust gas flow quantity Qexh.
Figure 7:
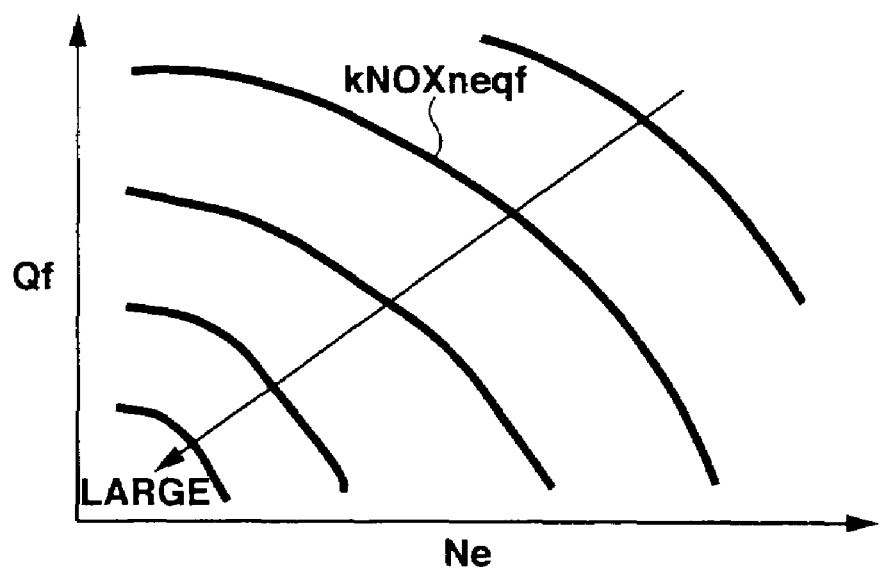
FIG. 7 is a calculation table representing a trap quantity correction coefficient kNOXneqf according to the driving states Ne and Qf.
Figure 10:
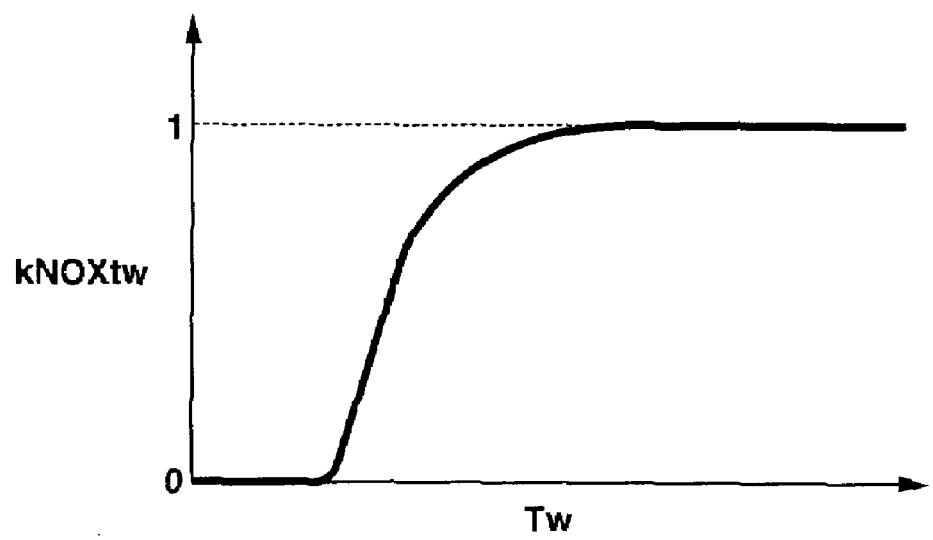
FIG. 10 is a table representing correction coefficient kNOXtw according to coolant temperature Tw.

At a step S203, ECU 51 multiplies NOx exhaust quantity NOXws calculated at step S202 with engine output Pe to convert NOXws into a quantity per unit time NOXs (=NOXws×Pe). It is noted that engine output Pe is deemed to correspond to an engine output equivalent value (=Qf× Ne) obtained by multiplying Qf with engine speed Ne with fuel injection quantity Qf assumed to be the torque. At a step S204, ECU 51 calculates a correction coefficient kNOXeoe which corresponds to an NOx exhaust quantity NOXs by searching a table shown in FIG. 5 according to NOx exhaust quantity NOXs per unit time. In the table shown in FIG. 5, Correction-coefficient kNOXeoe is set to 1 which corresponds to a certain value of NOXs or smaller and, otherwise, is set to become decreased as the NOXs becomes larger. In place of correction coefficient kNOXeoe, another correction coefficient kNOXngexh (FIG. 6) which is in accordance with exhaust gas flow quantity Qexh may be adopted. Or alternatively, a still another correction coefficient kNOXnqexh may be adopted which is in accordance with a driving state engine speed Ne such as engine speed Ne and fuel injection quantity Qf as shown in FIG. 7. Then, at a step S205, ECU 51 searches a table shown in FIG. 8 according to catalyst temperature Tbed to calculate correction coefficient kNOXtbed in accordance with catalytic temperature Tbed. In the table shown in FIG. 8, correction coefficient kNOXtbed is set to zero as a value of Tbed is equal to or smaller than a predetermined value. As the value of Tbed which is larger than the predetermined value becomes larger, the correction coefficient kNOXtbed indicates one. As shown in FIGS. 9A and 9B, catalyst temperature Tbed and coolant temperature Tw has a correlation to each other. Hence, in place of correction coefficient kNOXtbed, another correction coefficient kNOXtw (refer to FIG. 10) may be adopted.

Figure 11:
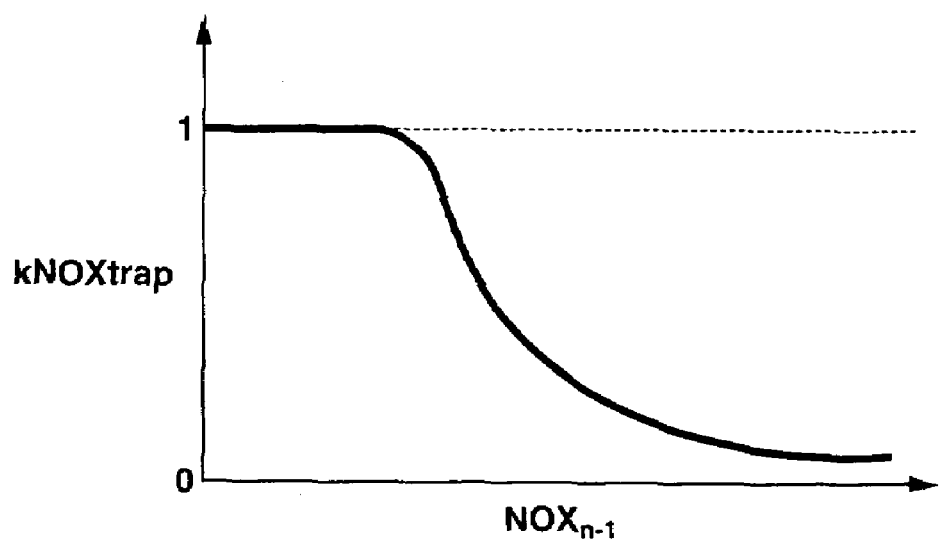
FIG. 11 a table representing correction coefficient kNOXtrap according to NOx trap quantity NOX.

At a step S206, ECU 51 searches a table shown in FIG. 11 according to NOx trap quantity NOXn−1 (It is noted that $_{n-1}$ denotes the calculation thereof at a previous routine of FIG. 3) to calculate correction coefficient kNOXtrap in accordance with NOx trap quantity NOX. In the table shown in FIG. 11, correction coefficient kNOXtrap is set to 1 as NOXn−1 becomes smaller than a predetermined value thereof and is set to become decreased as NOXn−1 becomes large. At a step S207, ECU 51 multiplies each correction coefficient kNOXeoe, kNOXtbed, and kNOXtrap calculated at corresponding steps S204, S205, and S206 to calculate a final correction coefficient kNOX (=kNOXeoe×KNOXtbed×kNOXtrap).

At a step S208, ECU 51 adds the newly trapped NOx quantity to NOx trap quantity NOXn−1 calculated when this routine is executed at a previous time. The NOx trap quantity NOX at the present time is calculated. The newly trapped NOx quantity dNOX is a product between NOx exhaust quantity NOXs per unit time and correction coefficient kNOX.

$$NOX = KOX_{n-1} + dNOX \quad\quad (1)$$
$$= NOX_{n-1} + NOXs \times kNOX.$$

Figure 12:
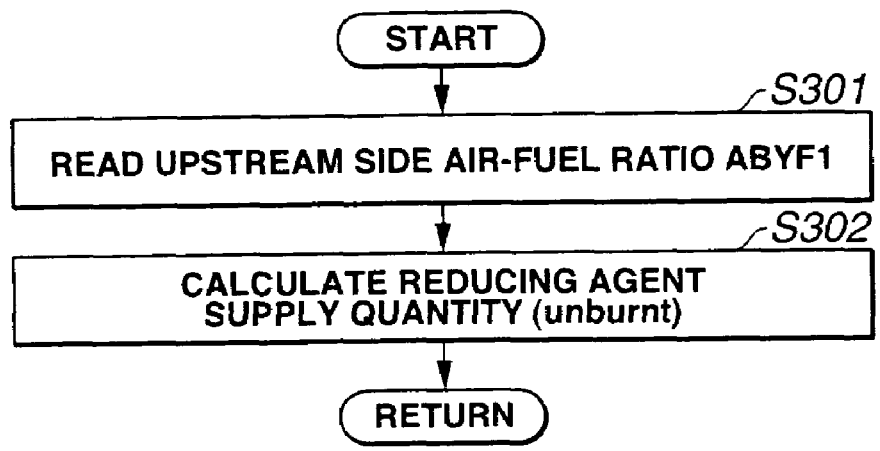
FIG. 12 is an operational flowchart representing a reducing agent supply quantity calculation routine.

FIG. 12 shows an operational flowchart on a reducing agent supply quantity calculation routine executed for each predetermined period of time, for example, 20 milliseconds.

Figure 13:
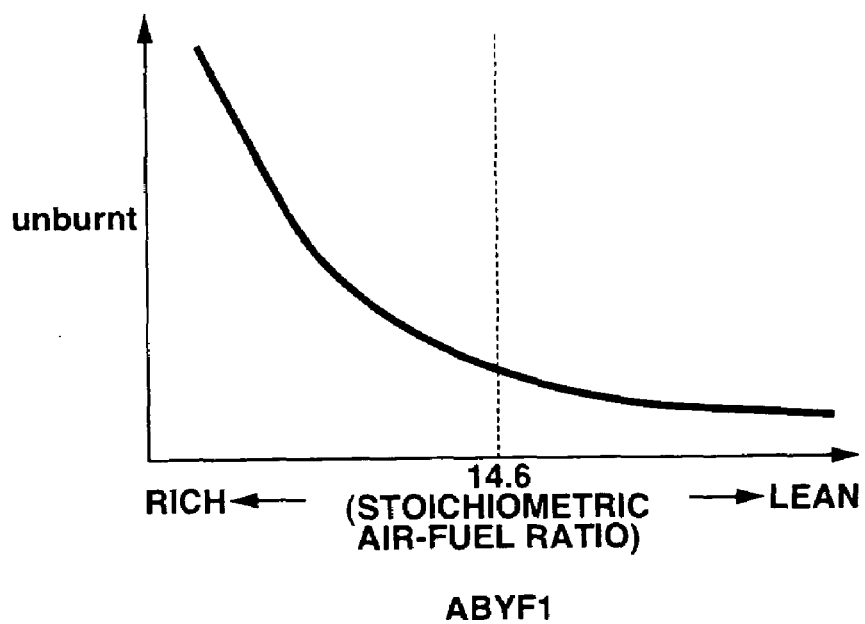
FIG. 13 is a table representing a calculation of the reducing agent supply quantity unburnt.

At a step S301, ECU 51 reads upstream side air-fuel ratio ABYFL. At a step S302, ECU 51 searches a table shown in FIG. 13 to calculate reducing agent supply quantity unburnt according to read ABYFI. In the table shown in FIG. 13, reducing agent supply quantity unburnt is set to have a large value so as to correspond to s small value ABYFI.

Figure 14:
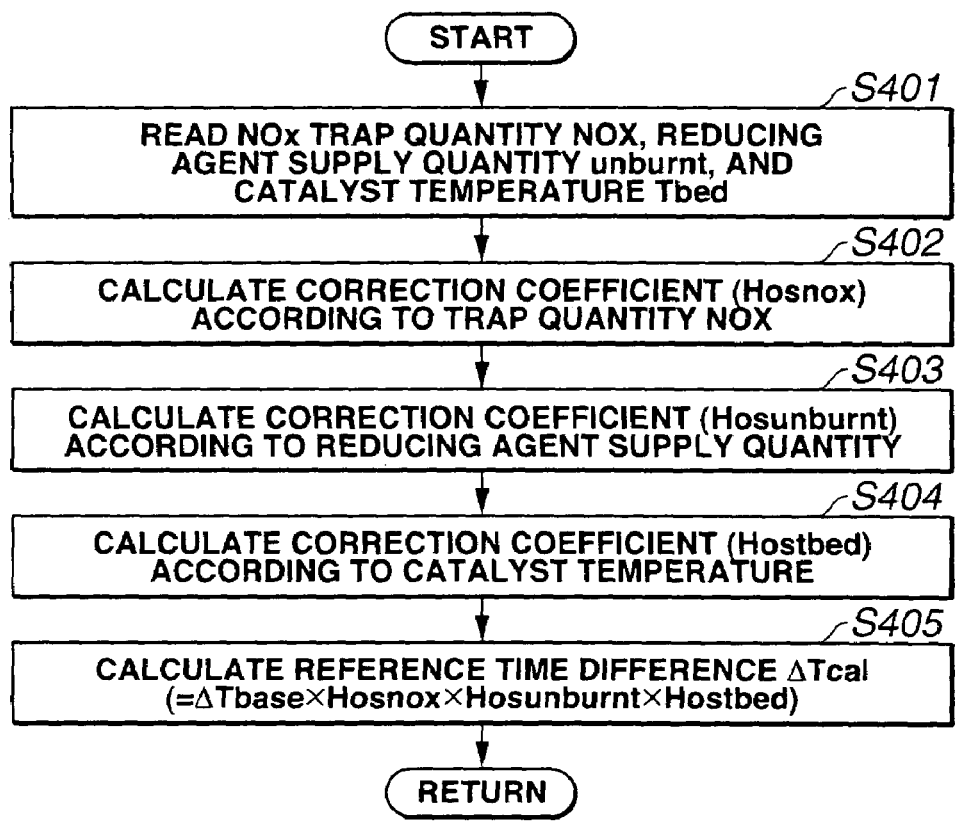
FIG. 14 is an operational flowchart representing a calculation routine of a reference time difference calculation routine.

Next, FIG. 14 shows an operational flowchart on a reference time difference calculation routine executed for each predetermined period of time, for example, 20 milliseconds.

Figure 16:
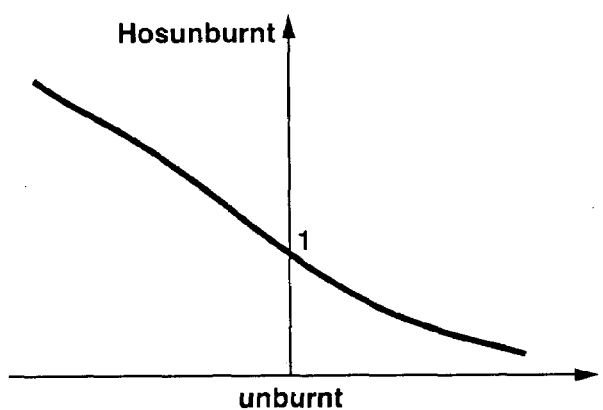
FIG. 16 is a table representing reference time difference correction coefficient Hosunburnt according to reducing agent supply quantity unburnt.
Figure 17:
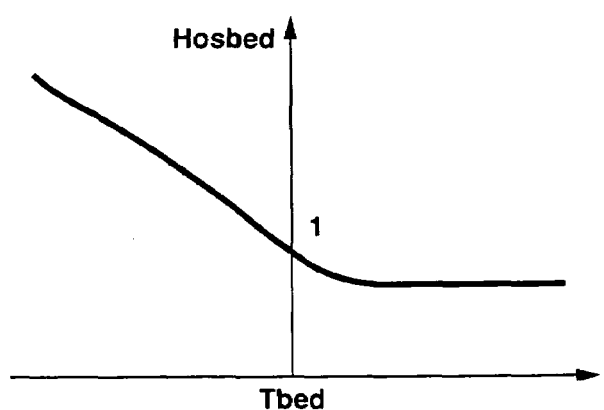
FIG. 17 is a table representing reference time difference correction coefficient Hostbed according to catalyst temperature Tbed.

At a step S401, ECU 51 reads NOx trap quantity, reducing agent supply quantity unburnt, and catalyst temperature Tbed. At a step S402, ECU 51 searches a table shown in FIG. 16 according to reducing agent supply quantity unburnt to calculate a correction coefficient Hosunburnt. In the table shown in FIG. 16, correction coefficient Hosunburnt is set to be a small value as the value of unburnt becomes larger. At a step S404, ECU 51 searches a table shown in FIG. 17 according to a read Tbed to calculate a correction coefficient Hostbed according to catalyst temperature Tbed. In the table shown in FIG. 17, with the value corresponding to catalyst temperature Tbed set to 1, as the value of Tbed becomes negatively smaller, correction coefficient Hostbed is set to become smaller. In a range equal to or larger than Tbed as a reference, a smaller constant value than one is set as Hostbed. At a step S405, ECU 51 calculates a reference time difference $\Delta$Tcal by multiplying each correction coefficient Hosnox, Hosunburnt, and Hostbed calculated at steps S402 through S404 with a reference value $\Delta$Tbase of the reference time difference (=$\Delta$Tbase×Hosnox×Hosunburnt×Hostbed). Basic value $\Delta$Tbase is a fixed value preset and is stored in ECU 51 (for example, in a case of microcomputer, ROM (Read Only Memory).

Figure 18:
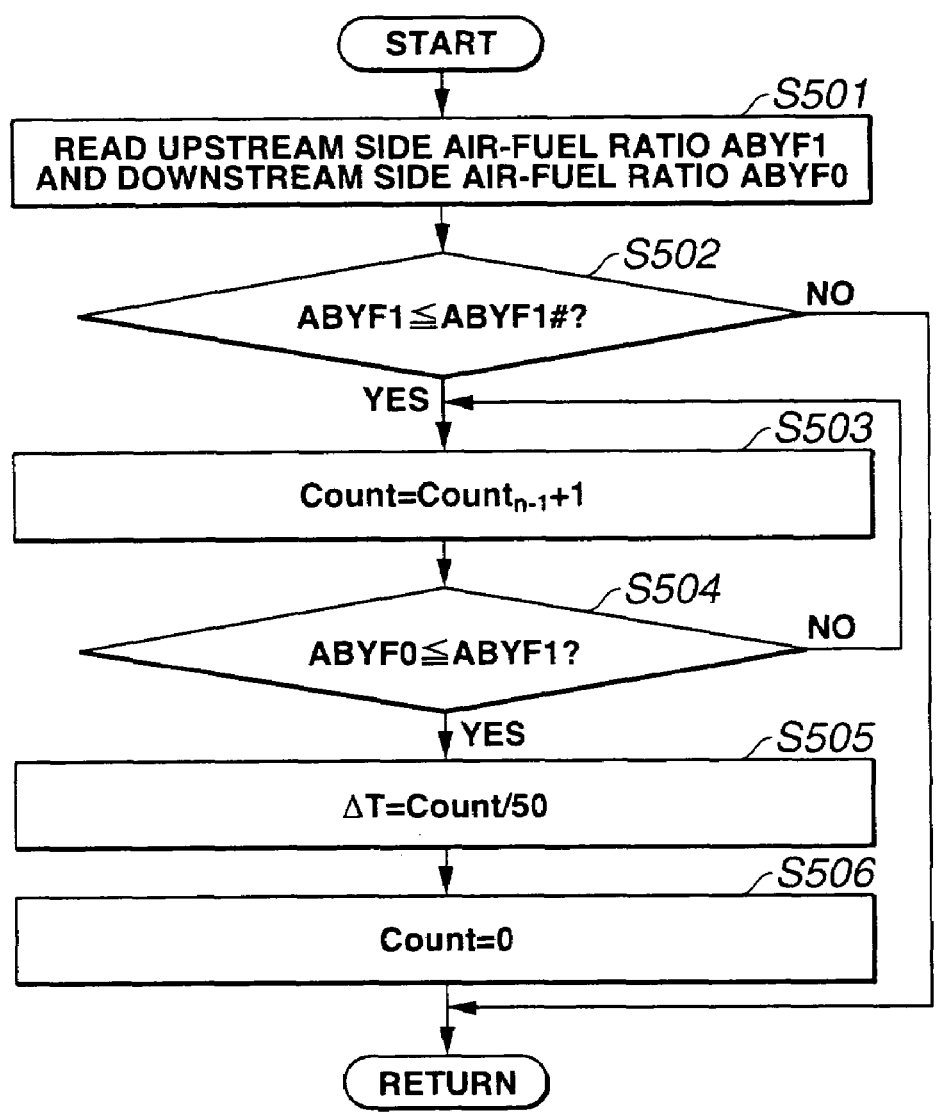
FIG. 18 is an operational flowchart representing an air-fuel ratio variation time difference calculation routine.

FIG. 18 shows an operational flowchart on air-fuel ratio variation time difference calculation routine executed for each predetermined period of time, for example, 20 milliseconds. At a step S501, ECU 51 reads upstream side air-fuel ratio ABYFI and downstream side air-fuel ratio ABYF0. At a step S502, ECU 51 determines whether the read ABYFI is changed from a normal value indicating a lean and is reached to a predetermined value ABYFI# (in this case, smaller than 14.6) indicating a rich. If reached to ABYF1# (Yes), the routine goes to a step S503. If not reached to ABYF1# (No), the present routine is ended. At a step S503, ECU 51 increments counter Count by one (Count=$Count_{n-1}$+1). At a step S504, ECU 51 determines whether read ABYF0 is made coincident with upstream side air-fuel ratio ABYF1. If coincident with each other (ABYF0$\leq$ABYFI), the routine goes to a step S505. If ABYF0$\geq$ABYFI (No) at a step S504, the routine returns to step S503. At step S505, counter Count is divided by 50 to convert the value of Count to a time (in this case, second) so that air-fuel ratio variation time difference $\Delta$T is detected. At a step S506, counter Count is reset to zero.

Figure 19A:
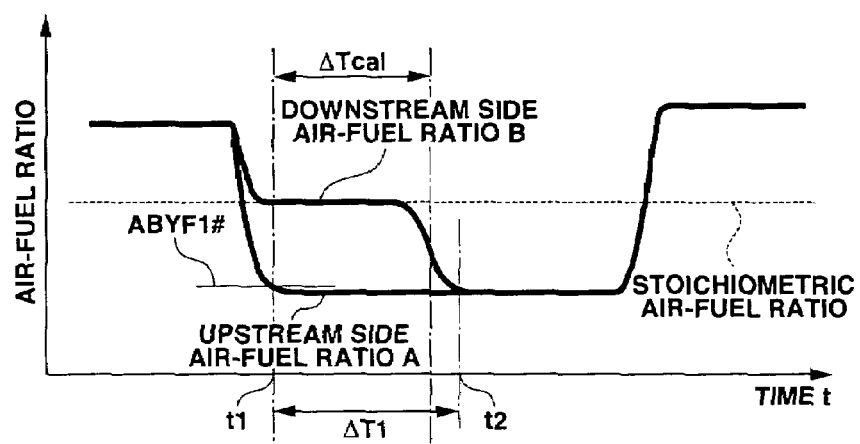
FIGS. 19A and 19B are characteristic graphs representing an upstream side air-fuel ratio ABYFI and a downstream side air-fuel ratio ABYFO.
Figure 19B:
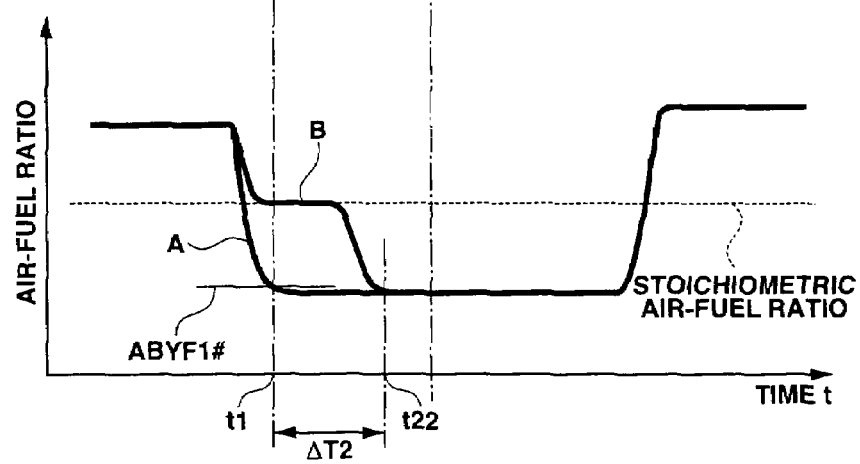
Figure 20:
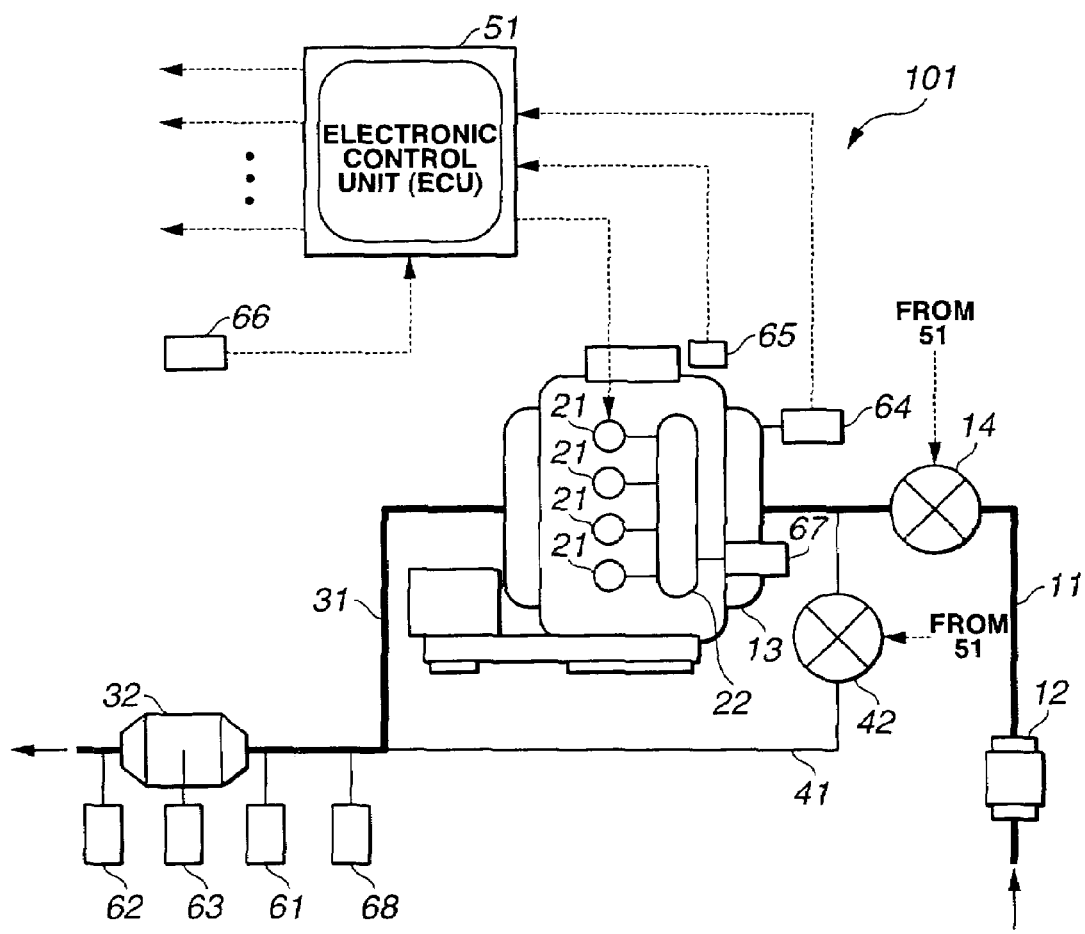
FIG. 20 is a rough system configuration view of the exhaust gas purifying apparatus in another preferred embodiment according to the present invention.

Next, an operation of ECU 51 will be described with reference to a timing chart integrally shown in FIGS. 19A and 19B. FIGS. 19A and 19B show variations of upstream and downstream side air-fuel ratios ABYFI and ABYF0 with respect to time. FIG. 19A shows the case in which NOx trap catalyst 32 is normal since this time difference $\Delta$T1 is longer than reference time difference $\Delta$Tcal and FIG. 19B shows the case in which NOx trap catalyst 32 is deteriorated since this time difference $\Delta$T2 is shorter than reference time difference $\Delta$Tcal. In FIG. 19B, A denotes the upstream side air-fuel ratio, B denotes the downstream side air-fuel ratio and t22 denotes t2 in the case of FIG. 19B.

Figure 15:
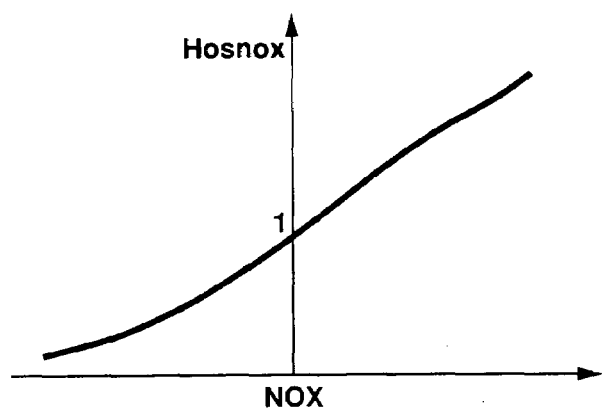
FIG. 15 is a table representing a reference time difference correction coefficient Hostbed according to catalyst temperature Tbed.

When ECU 51 determines that NOx trap quantity NOX has reached to predetermined value NOX1, excess air rate $\lambda$ is controlled so that air-fuel ratio of exhaust gas is turned to be rich. It is noted that upstream side air-fuel ratio ABYFI is varied to follow this control. On the other hand, downstream side air-fuel ratio ABYFO does not follow this control but is held at a value corresponding to the stoichiometric air-fuel ratio (namely, 1) for a certain time after change to the value corresponding to the stoichiometric air-fuel ratio and, furthermore, is changed, and finally is made coincident with upstream side air-fuel ratio ABYFI. This is because the reducing agent supplied to NOx trap catalyst 32 is consumed to a reaction with oxygen stored in NOx trap catalyst 32 and is passed through NOx trap catalyst 32 after the stored oxygen and trapped NOx have been eliminated. ECU 51 identifies a time point t1 at which upstream side air-fuel ratio ABYFI has reached to predetermined value ABYF1# indicating the rich and identifies a time point t2 at which downstream side air-fuel ratio ABYFO is made coincident with upstream side air-fuel ratio ABYFI. Then, a time duration between time points t1 and t2 is detected as air-fuel ratio variation time difference $\Delta$T becomes shorter as the deterioration of NOx trap catalyst 32 becomes advanced. ECU 51 determines that NOx trap catalyst 32 has been deteriorated in a case where detected air-fuel ratio variation time difference $\Delta$T is equal to or shorter than reference time difference $\Delta$Tcal. ECU 51 determines that NOx trap catalyst 32 is normal in a case where $\Delta$T is in excess of reference time difference $\Delta$Tcal. If deteriorated, some measure has been taken to the vehicle driver. ECU 51 corrects reference time difference $\Delta$Tcal in accordance with correction coefficient Hosnox based on NOx trap quantity NOX, correction coefficient Hosunburnt based on reducing agent supply quantity unburnt, and correction coefficient Hostbed based on catalyst temperature Tbed. For example, as NOx trap quantity NOX becomes increased, reference time difference $\Delta$Tcal is extended (FIG. 15: Hosnox).

The exhaust gas purifying apparatus in this embodiment has the following advantages. First, since reference time difference $\Delta$Tcal is corrected which is a threshold value to determine the performance deterioration of NOx trap catalyst 32 according to NOx trap quantity NOX, reducing agent supply quantity unburnt, and catalyst temperature Tbed, the deterioration can be determined according to reference time difference $\Delta$Tcal which is appropriately set and an accurate determination of the performance deterioration of NOx trap catalyst 32 can be made. Secondly, since predetermined value NOX1 related to NOx trap quantity NOX is set to a quantity at which NOx trap catalyst 32 is at the timing at which NOx regeneration is carried out and the deterioration of NOx trap catalyst 32 is made together with the regeneration of NOx, a frequency at which the air-fuel ratio of exhaust gas is turned to be rich is decreased and the worsening of the fuel consumption can be suppressed. Thirdly, since the deterioration is determined immediately after the poisoning of NOx trap catalyst 32 due to the sulfide compound is released, this poisoning can avoid the influence given to air-fuel ratio variation time difference $\Delta$T. An erroneous determination of the deterioration of NOx trap catalyst 32 can be prevented.

In this embodiment, step S103 in the flowchart of FIG. 2 constitutes rich controlling section (means), step S502 in the flowchart of FIG. 18 constitutes a first time point specifying section (means), step S107 in the flowchart of FIG. 2 constitutes the air-fuel ratio variation time difference detecting section (steps S503 and S504 in the flowchart of FIG. 18), steps S101, S105, S106, and steps S108 through S110 constitute deterioration determining section.

In this embodiment, quantity NOXs of NOx exhausted from engine 1 per unit time NOXs when detecting NOx trap quantity NOX is calculated. As an engine in another embodiment, a sensor 68 disposed at the upstream side of NOx trap catalyst 32 to detect NOx concentration in the exhaust gas may calculate NOx exhaust quantity NOXs on the basis of the output from this sensor 68 (NOXs=Qexh×Dnox: Qexh denotes the exhaust gas flow quantity and Dnox denotes an NOX concentration).

In addition, in the above-described embodiment, together with the identification of the first time point at which upstream air-fuel ratio ABYFI and predetermined value ABYFI# are compared to specify the first time point and that of the second time point at which downstream side air-fuel ratio ABYFO is compared with upstream air-fuel ratio ABYFI is carried out. First and second time points may be identified according to, for example, ABYFI# as a predetermined value having the degree indicating the rich.

The entire contents of a Japanese Patent Application No. 2003-166046 (filed in Japan on Jun. 11, 2003) are herein incorporated by reference. The scope of the invention is defined with reference to the following claims.

What is claimed is:

1. An exhaust gas purifying apparatus for an internal combustion engine, comprising:
    an NOx trap catalyst trapping NOx in the exhaust gas when an air-fuel ratio of the exhaust gas flowing thereinto is lean and discharging the trapped NOx when the air-fuel ratio of the exhaust gas flowing thereinto is rich;
    a rich controlling section that performs a rich control to richen the air-fuel ratio flowing into an NOx trap catalyst;
    a first time point specifying section that specifies a first time point at which the air-fuel ratio of the exhaust gas at an upstream side of the NOx trap catalyst has reached a first predetermined value indicating a rich air-fuel ratio;
    a second time point specifying section that specifices a second time point at which the air-fuel ratio of the exhaust gas at a downstream side of the NOx trap catalyst has reached a second predetermined value indicating a rich air-fuel ratio;
    an air-fuel ratio variation time difference detecting section that detects a time duration from the first time point to the second time point in a form of an air-fuel ratio variation time difference; and
    a performance deterioration determining section that determines a degree of a performance deterioration of the NOx trap catalyst on the basis of the detected air-fuel ratio variation time difference, the performance deterioration determining section determining the degree of the performance deterioration with at least one correcting factor selected from the group consisting of a quantity of NOx trapped by means of the NOx trap catalyst, a reducing agent supply quantity by which a reducing agent is supplied to the NOx trap catalyst, and catalyst temperature which is a temperature of the NOx trap catalyst, at least one of the correcting factors being reflected on the determination of the degree of the performance deterioration of the NOx trap catalyst, wherein the performance deterioration determining section determines whether the NOx trap catalyst reaches a performance deterioration level by comparing the detected air-fuel ratio variation time difference with a reference time difference having a length in time varied in accordance with a predetermined degree of the performance deterioration of the NOx trap catalyst and the reference time difference is corrected by the correcting factor.

2. An exhaust gas purifying apparatus for an internal combustion engine as claimed in claim 1, wherein the first time point specifying section includes a section that detects the air-fuel ratio of the exhaust gas at the upstream side of the NOx trap catalyst and the second time point specifying section includes a section that detects the air-fuel ratio of the exhaust gas at the downstream side of the NOx trap catalyst.

3. An exhaust gas purifying apparatus for an internal combustion engine as claimed in claim 1, wherein the performance deterioration determining section provides a correction factor for the NOx trap quantity when the rich control is started.

4. An exhaust gas purifying apparatus for an internal combustion engine as claimed in claim 1, further comprising a section that determines a timing at which a regeneration of NOx in the NOx trap catalyst is carried out by discharging the trapped NOx from the NOx trap catalyst and wherein the rich control section performs the rich control when NOx is regenerated.

5. An exhaust gas purifying apparatus for an internal combustion engine as claimed in claim 1, further comprising a section that releases a poisoning of the NOx trap catalyst by discharging a trapped sulfide compound and wherein the performance deterioration determining section comprises a section that determines the degree of the performance deterioration of the NOx trap catalyst only during an elapse of a predetermined period of time from a time at which the poisoning of the NOx trap catalyst is released.

6. An exhaust gas purifying apparatus for an internal combustion engine as claimed in claim 1, wherein each of the correcting factors is reflected on the degree of the performance deterioration of the NOx trap catalyst.

7. An exhaust gas purifying apparatus for an internal combustion engine as claimed in claim 1, wherein the performance deterioration determining section includes a section that detects an NOx trap quantity as a calculated value obtained by accumulating the quantity of NOx exhausted per unit time from the engine when the NOx trap quantity is the correction factor.

8. An exhaust gas purifying apparatus for an internal combustion engine as claimed in claim 7, wherein the deterioration determining section includes a section that detects an intake air quantity of the engine and the NOx trap quantity detecting section detects the NOx trap quantity of the NOx trap catalyst on the basis the detected intake air quantity.

9. An exhaust gas purifying apparatus for an internal combustion engine as claimed in claim 7, wherein the performance deterioration determining section includes a section that detects a concentration of NOx in the exhaust gas and the NOx trap quantity detecting section calculates the NOx trap quantity exhausted per unit of time on the basis of the detected concentration of NOx.

10. An exhaust gas purifying apparatus for an internal combustion engine as claimed in claim 7, wherein the performance deterioration determining section includes a section that detects a temperature of the NOx trap catalyst and each quantity of NOx is corrected in accordance with the detected temperature when the quantity of NOx exhausted per unit time is accumulated.

11. An exhaust gas purifying apparatus for an internal combustion engine as claimed in claim 1, wherein the deterioration determining section sets the reducing agent supply quantity per unit time at a time of a start of a rich control to be the correcting factor.

12. An exhaust gas purifying apparatus for an internal combustion engine as claimed in claim 11, wherein the performance deterioration determining section includes a section that detects the air-fuel ratio of the exhaust gas at an upstream side of the NOx trap catalyst and a section that detects a reducing agent supply quantity as a calculated value based on the detected air-fuel ratio.

13. An exhaust gas purifying apparatus for an internal combustion engine as claimed in claim 1, wherein the performance deterioration determining section determines whether the NOx trap catalyst reaches a performance deterioration level by comparing the detected air-fuel ratio variation time difference with a reference time difference having a length in time varied in accordance with a predetermined degree of the performance deterioration of the NOx trap catalyst and the reference time difference is corrected by each of the correcting factors.

14. An exhaust gas purifying apparatus for an internal combustion engine as claimed in claim 6, wherein the performance deterioration determining section comprises: a reference time difference correcting section that corrects the reference time difference ($\Delta T_{cal}$) in accordance with each of the correcting factors as follows: $\Delta T_{cal} = \Delta T_{base} \times H_{osnox} \times H_{osunburnt} \times H_{ostbed}$, wherein $\Delta T_{base}$ denotes a basic fixed value of the reference time difference, $H_{osnox}$ denotes a first correction factor according to the quantity of NOx trapped in the NOx trap catalyst, $H_{osunburnt}$ denotes a second correction factor according to the quantity of reducing agent in the NOx trap catalyst, and $H_{ostbed}$ denotes a third correction factor according to the temperature of the NOx trap catalyst.

15. An exhaust gas purifying apparatus for an internal combustion engine as claimed in claim 14, wherein the first correction factor of $H_{osnox}$ is set to one when the trap quantity of NOx in the NOx trap catalyst indicates a predetermined value and, as the trap quantity is increased, the value of the first correction factor $H_{osnox}$ becomes larger.

16. An exhaust gas purifying apparatus for an internal combustion engine as claimed in claim 14, wherein the second correction factor of $H_{osunburnt}$ is set to one when the supply quantity of the reducing agent to the NOx trap catalyst indicates a predetermined value and, as the supply quantity of the reducing agent becomes larger, the value of the second correction factor $H_{osunburnt}$ becomes smaller.

17. An exhaust gas purifying apparatus for an internal combustion engine as claimed in claim 14, wherein the third correction factor of $H_{ostbed}$ is set to one when the temperature of the NOx trap catalyst indicates a predetermined value, as the temperature becomes increased, the value of third correction factor $H_{ostbed}$ becomes decreased, and, when the temperature of the NOx trap catalyst becomes another predetermined value which is higher than the predetermined value, the value of the third correction factor $H_{ostbed}$ becomes a constant value smaller than one.

18. An exhaust gas purifying apparatus for an internal combustion engine, comprising:
NOx trap catalyst means for trapping NOx in the exhaust gas when an air-fuel ratio of the exhaust gas flowing thereinto is lean and for discharging the trapped NOx when the air-fuel ratio of the exhaust gas flowing thereinto is rich;
rich controlling means for performing a rich control to richen the air-fuel ratio flowing into the NOx trap catalyst means;
first time point specifying means for specifying a first time point at which the air-fuel ratio of the exhaust gas at an upstream side of the NOx trap catalyst has reached a first predetermined value indicating a rich air-fuel ratio;
second time point specifying means for specifying a second time point at which the air-fuel ratio of the exhaust gas at a downstream side of the NOx trap catalyst means has reached a second predetermined value indicating a rich air-fuel ratio;
air-fuel ratio variation time difference detecting means for detecting a time duration from the first time point to the second time point in a form of an air-fuel ratio variation time difference; and
performance deterioration determining means for determining a degree of a performance deterioration of the NOx trap catalyst on the basis of the detected air-fuel ratio variation time difference, the performance deterioration determining means determining the degree of the performance deterioration with at least one correcting factor selected from the group consisting of a quantity of NOx trapped by means of the NOx trap catalyst means, a reducing agent supply quantity by which a reducing agent is supplied to the NOx trap catalyst means, and catalyst temperature which is a temperature of the NOx trap catalyst means, at least one of the correcting factors being reflected on the determination of the degree of the performance deterioration of the NOx trap catalyst means, wherein the performance deterioration determining means determines whether the NOx trap catalyst reaches a performance deterioration level by comparing the detected air-fuel ratio variation time difference with a reference time difference having a length in time varied in accordance with a predetermined degree of the performance deterioration of the NOx trap catalyst means and the reference time difference is corrected by the correcting factor.

19. An exhaust gas purifying method for an internal combustion engine, comprising:
providing an NOx trap catalyst trapping NOx in the exhaust gas when an air-fuel ratio of the exhaust gas flowing thereinto is lean and discharging the trapped NOx when the air-fuel ratio of the exhaust gas flowing thereinto is rich;
performing a rich control to richen the air-fuel ratio flowing into an NOx trap catalyst;
specifying a first time point at which the air-fuel ratio of the exhaust gas at an upstream side of the NOx trap catalyst has reached a first predetermined value indicating a rich air-fuel ratio;
specifying a second time point at which the air-fuel ratio of the exhaust gas at a downstream side of the NOx trap catalyst has reached a second predetermined value indicating a rich air-fuel ratio;
detecting a time duration from the first time point to the second time point in a form of an air-fuel ratio variation time difference; and
determining a degree of a performance deterioration of the NOx trap catalyst on the basis of the detected air-fuel ratio variation time difference, at the performance deterioration determination, determining the degree of the performance deterioration with at least one correcting factor selected from the group consisting of a quantity of NOx trapped by means of the NOx trap catalyst, a reducing agent supply quantity by which a reducing agent is supplied to the NOx trap catalyst, and catalyst temperature which is a temperature of the NOx trap catalyst, at least one of the correcting factors being reflected on the determination of the degree of the performance deterioration of the NOx trap catalyst, wherein, at the performance deterioration determining, determining whether the NOx trap catalyst reaches a performance deterioration level by comparing the detected air-fuel ratio variation time difference with a reference time difference having a length in time varied in accordance with a predetermined degree of the performance deterioration of the NOx trap catalyst is made and the reference time difference is corrected by the correcting factor.

* * * * *